J. S. McCALLUM.
THRESHING MACHINE.
APPLICATION FILED FEB. 13, 1913.
1,075,985.
Patented Oct. 14, 1913.
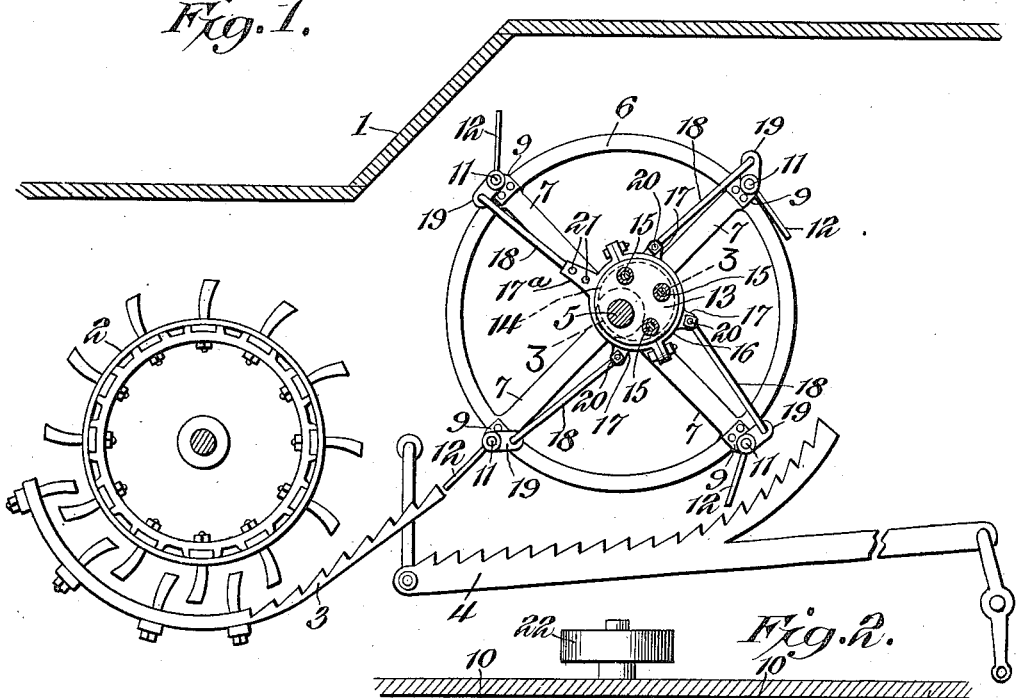
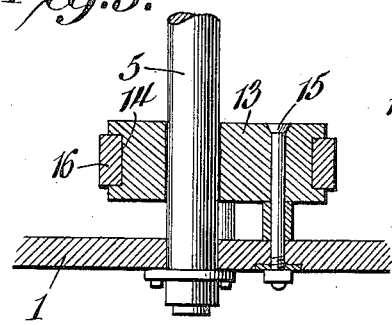
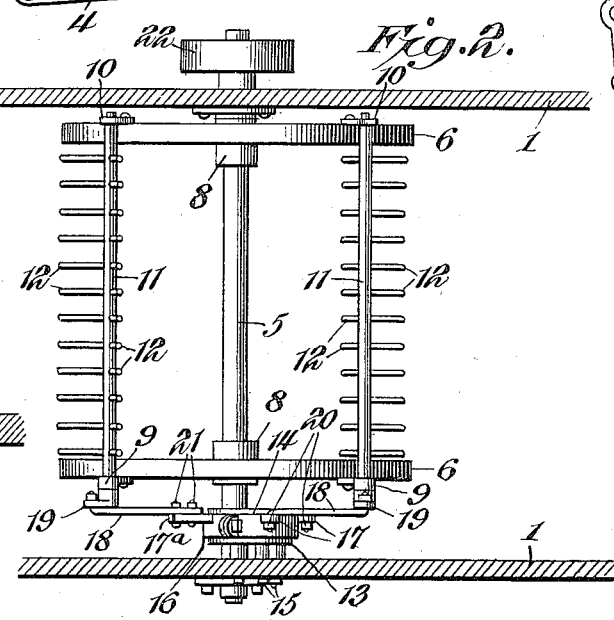
WITNESSES
Howard D. Orr
F. T. Chapman
J. S. McCallum, INVENTOR,
BY E. G. Siggers
ATTORNEY
COLUMBIA PLANOGRAPH CO., WASHINGTON, D.

UNITED STATES PATENT OFFICE.

JOHN S. McCALLUM, OF GOLDFIELD, IOWA.

THRESHING-MACHINE.

1,075,985. Specification of Letters Patent. Patented Oct. 14, 1913.

Application filed February 13, 1913. Serial No. 748,254.

*To all whom it may concern:*

Be it known that I, JOHN S. MCCALLUM, a citizen of the United States, residing at Goldfield, in the county of Wright and State of Iowa, have invented a new and useful Threshing-Machine, of which the following is a specification.

This invention has reference to improvements in threshing machines, and is designed to provide an improved beater or fork drum located immediately behind the cylinder of a grain separator.

In accordance with the present invention the forks are mounted upon a revolving drum and are provided with an actuating mechanism whereby each fork is rocked in a manner to move it into active position to propel the straw across the straw rack and during such movement the fork is rocked in a direction to relieve it from engagement with the straw and the latter is not thrown violently away from the drum. Moreover, there is no liability of winding the straw upon the drum as often occurs in structures of like character as heretofore proposed. Moreover, the present invention has the advantage of allowing the grate behind the cylinder to be raised very high without causing wrapping of the straw about the cylinder. Also, the rack or fork drum keeps the racks clean under it and no trouble is encountered no matter what may be the condition of the grain.

The invention will be best understood from a consideration of the following detailed description, taken in connection with the accompanying drawings forming a part of this specification, with the further understanding that while the drawings show a practical embodiment of the invention the latter is not confined to any strict conformity with the showing of the drawings but may be changed and modified so long as such changes and modifications mark no material departure from the salient features of the invention.

In the drawings:—Figure 1 is a longitudinal section of a portion of a threshing machine illustrating the present invention. Fig. 2 is a plan view of the fork drum with the casing of the machine in section. Fig. 3 is a fragmentary section on the line 3—3 of Fig. 1 but drawn on a larger scale.

In the drawings there is shown a small portion of a casing 1 which may be taken as typical of any suitable type of threshing machine or grain separator and within this casing there is located a threshing cylinder 2 which may also be taken as typical of any type of threshing cylinder and beneath the cylinder is a grate 3 of any suitable type, while back of the grate is located a straw rack 4. All these parts while usually found in threshing machines or grain separators have nothing to do so far as their particular construction is concerned, with the present invention, and therefore need no specific description and may be taken as typical of any suitable construction of the parts named, except that the grate 3 terminates higher than heretofore.

Suitably journaled above and in transverse relation to the straw rack is a shaft 5 upon which are mounted heads 6 each composed of a suitable rim and spokes 7 connecting to hubs 8 in turn carried by the shaft 5. The rims 6 carry bearings 9, 10, respectively, in which are journaled the respective ends of shafts 11 parallel with the shaft 5 and in conjunction with the rims 6 and spokes 7 defining a fork drum. The shafts 11 are provided with series of tines 12 which may be in radial relation to the shafts, so that each shaft 11 with its tines 12 constitutes a fork and in the particular construction shown the fork drum is provided with four forks, although such number is by no means obligatory.

Surrounding the shaft 5 near one end thereof within the casing 1 is a block 13 having a peripheral groove 14. This block is circular in outline, but is eccentric to the shaft 5 and while surrounding the shaft is not in any manner made fast thereto, but the shaft 5 may freely rotate without imparting any motion to the block 13. Bolts 15 traverse the block 13 and secure the same to the adjacent portion of the casing 1, so that the block is held by the bolts against movement.

Mounted in the groove 14 is an eccentric strap 16, this strap being shown as made of two parts suitably secured together so that it may be readily applied to the eccentric block 13. The strap is provided with an appropriate number of ears 17 which may offstand therefrom and one of these ears, indicated at 17ª, is somewhat prolonged. Connected to each ear 17 and 17ª is one end of a link 18, the other end of which is pivotally connected to an arm 19 extending radially from the corresponding end of a respective shaft 11, the arm being made fast to the shaft 11, so that any movement imparted to the arm will be transmitted to the shaft. The connection between each link 18 and the ear 17 may be by means of a single bolt 20, while the connection between the respective link 18 and the prolonged ear 17ª may be by means of two or more bolts 21, so that the eccentric strap will be held in a certain determined relation to the fork drum, while still permitted to have such movements as are imparted to it by the eccentric block 13. The arrangement is such that when the fork drum is rotated as by a belt applied to a pulley 22 on the shaft 5, the forks will participate in the rotative movement of the drum, but by the action of the rotating eccentric strap 16 about the fixed eccentric block 13, the eccentric strap is given a movement in an eccentric path causing a constantly changing relation of the links 18 to the axis of rotation of the fork drum and consequently a rocking of the shafts 11 correspondingly. The parts are so timed in operation that the fork tines 12 are so positioned as to outstand from the peripheral portion of the drum in approximately radial relation to the axis of rotation of the drum as the forks approach the position where they engage the straw received from the threshing cylinder 2. Moreover, the elevated rear end of the grate 3 is so related to the fork drum that the tines on passing it are substantially in line with the grate and move past it in paths substantially perpendicular to the rear end of the grate. The material caught by the forks is carried over the straw rack 4, but the tines of the fork are being constantly moved more and more toward a trailing position with reference to the direction of rotation of the drum until by the time the straw reaches the end of the straw rack the impelling action of the forks ceases, and the straw is therefore not thrown so far back of the straw rack as occurs with beaters as heretofore constructed.

What is claimed is:—

1. In a threshing machine, a fork drum comprising a shaft with spaced heads thereon, a peripheral series of shafts mounted on the heads and extending parallel with the drum shaft, tines carried by the peripheral series of shafts, a rock arm on each peripheral shaft, an eccentric strap and link connections therefrom to the respective rock arms, and an eccentric block carrying the strap and encircling the drum shaft, said block having means for holding it against rotation.

2. In a threshing machine, the combination with a grate having the rear end raised, and a straw rack having the forward end lower than the rear end of the grate, of a fork drum above the straw rack and having rockable forks thereon, and means for rocking the forks into active relation to the raised rear end of the grate and to the straw rack and into trailing relation with respect to the direction of rotation of the forks as they move over the straw rack, the rear raised end of the grate and the forks being so disposed as to cause the free ends of the tines of the forks to move across the raised end of the grate in paths substantially perpendicular to the grate and with said tines in substantial alinement with the said raised end of the grate.

3. In a threshing machine, a fork drum comprising a shaft, spaced heads mounted thereon, rock shafts journaled on the peripheral portion of the drum in parallel relation to the first shaft, tines carried by the rock shafts, rock arms on the rock shafts, an eccentric block provided with means for holding it against rotation, an eccentric strap mounted on the block, and link connections between the strap and rock arms, one of the link connections being fixed to the strap.

4. In a threshing machine, a fork drum provided with a peripheral series of rock shafts each provided with a rock arm, tines carried by the rock shafts, an eccentric strap and eccentric block carrying the latter and having means for holding it against rotation, and connections between the rock arms and the eccentric strap, one of said connections being fixed to the eccentric strap, and the other connections being pivoted thereto.

In testimony that I claim the foregoing as my own, I have hereto affixed my signature in the presence of two witnesses.

JOHN S. McCALLUM.

Witnesses:
 B. W. McELHINNEY,
 B. E. HAUGNER.

Copies of this patent may be obtained for five cents each, by addressing the "Commissioner of Patents, Washington, D. C."